July 17, 1928.
C. L. STOKES
1,677,308
METHOD OF INFLATING AND DRIVING AN AERIAL MACHINE AND MEANS THEREFOR
Filed July 14, 1925
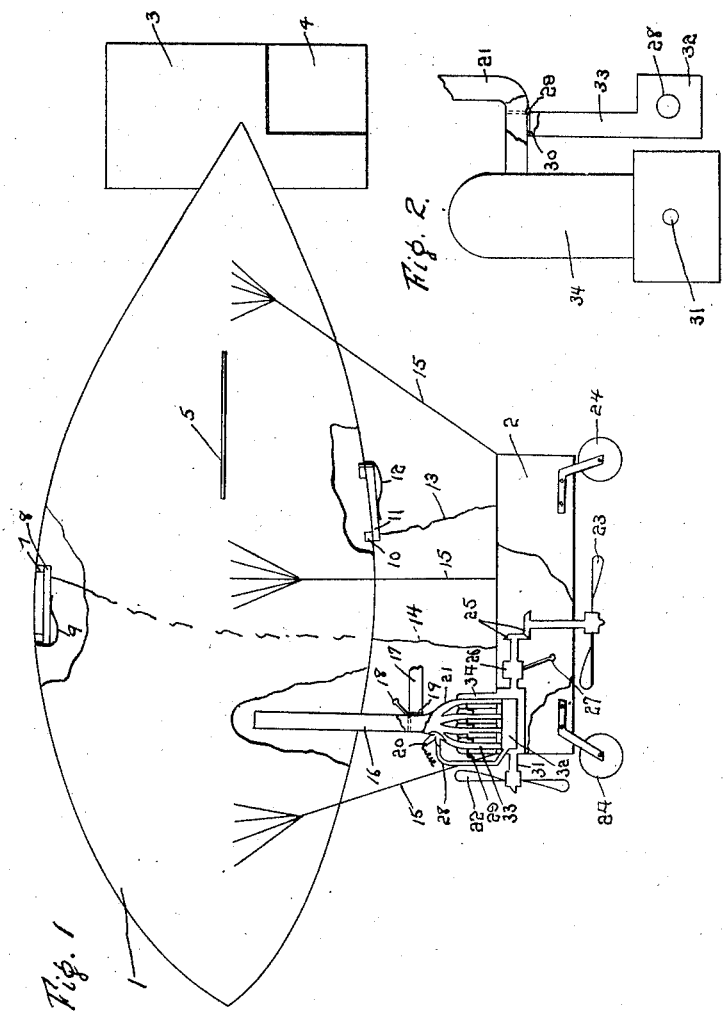
INVENTOR
Charles L. Stokes Patented July 17, 1928.

1,677,308

UNITED STATES PATENT OFFICE.

CHARLES LAWRENCE STOKES, OF LOS ANGELES, CALIFORNIA.

METHOD OF INFLATING AND DRIVING AN AERIAL MACHINE AND MEANS THEREFOR.

Application filed July 14, 1925. Serial No. 43,606.

My invention relates to improvements in methods of aerial transportation whereby danger of fire or explosion is eliminated and whereby the flying mechanism may be constructed and operated with a minimum of expense and labor.

It is an object of my invention to provide a flying machine which may be universally used with the same facility and ease as the Ford automobile.

It is a further object to provide an aerial machine which can alight and be contained in a very small place.

It is another object to provide an aerial machine which is automatically self-inflating, and self-supporting.

It is another object to provide an aerial machine which may remain suspended over one particular spot.

This application is a continuation in part of my co-pending application S. N. 497,812, filed September 2nd, 1921.

Further objects will become apparent by references to the drawings in which Fig. 1 shows an elevation of my apparatus with cutaway sections and Fig. 2 shows a detail elevation with cutaway section of the mechanism. In the drawings like numbers refer to the same parts.

1 represents an envelope or balloon which is normally designed to be inflated by a gas or heated air and is composed in general of any of the fabrics suitable for such purposes as may be obtainable. 2 is the nacelle attached to the balloon and suspended therefrom by cords 15 in any well known manner. 3 is a vertical stabilizing plane in which is inserted a movable rudder 4 for giving direction through the balloon in a horizontal direction and the rudder is operated from the nacelle in any well known manner (not shown). 5 represents stabilizing and elevating rudders attached to each side of the balloon for the purpose of directing the course of the balloon in an upward and downward direction and are designed to be operated likewise from the nacelle in any well known manner (not shown). 7 represents an aperture in the uppermost part of the balloon which has a closure 8 held in position by a spring 9 and designed to be operated from the nacelle by a rope 14. 10 is an aperture in the bottom of the balloon which has a closure 11 held in position by a spring 12 and is designed to be operated automatically, or from the nacelle by a rope 13. Both of these closures are shown more or less diagrammatically and represent the usual closures and openings for releasing gas or a portion of the gas when required, in any well known manner, but 11 also performs another important duty which will be later described.

In the nacelle is mounted an internal combustion engine 34 having a crank shaft 31 to which is attached a propeller 22 such as is known as a feathering propeller adapted to be thrown in or out of gear with the engine by means (not shown), said engine having multiple cylinders to each of which is attached an arm 21 of the exhaust manifold leading into an exhaust pipe 16, the upper end of which is introduced into the interior of the balloon. The exhaust manifolds 21 and exhaust pipe 16 are thoroughly insulated, to retain heat, in any well known manner. Leading from the exhaust pipe 16 is a by-pass 17 for diverting gases to atmosphere and the passage of the gases through 16 is controlled at the will of the operator by a valve 19 through handle 18. Close to the point where the exhaust manifolds 21 are joined to the engine cylinders are pipes 33, which open at one end into the manifolds 21 and at the other end into a box-like container 32 which is closed at one end and at the other end is connected by a pipe 28 into the lower portion of exhaust pipe 16.

Substantially at the point of entry of pipe 28 into pipe 16 is inserted a spark plug 20 joined to any source of ignition, such as for instance the ignition system of the engine 34, and at the entry of pipes 33 into pipes 21 are placed a series of valves 30, controlled at the will of the operator by a handle 29 having purposes which will be hereinafter described.

The rear end of the crank shaft 31 is connected into a gear box 26 which is controlled by a gear shifting lever 27 and adapted to drive therethrough a set of gears 25 for the purpose of operating a propeller 23, or the gear box may be dispensed with and propeller 23 may be constructed as a variable pitch or feathering propeller.

In describing propellers 22 and 23 as variable pitch, or feathering, propellers, it is intended to utilize herein the well known effects of such propellers many kinds of which are suited to my invention and therefore I do not illustrate or describe any specific variable pitch propeller inasmuch as the same, per se, forms no part of my invention.

The nacelle is mounted on four wheels or supports 24 which may be spring-mounted, or otherwise built, for the purpose of providing an efficient landing or running gear.

My invention embodies improvements on the old and well known principle of inflating a balloon or envelope by heated gases whereby a volume of heated and expanded gases are much lighter than a corresponding volume of air and in consequence their buoyancy is sufficient to raise an envelope or balloon and with it a considerable extra weight.

Whereas this principle has heretofore been used for the purpose of giving exhibition liftings whereby an operator was carried up into the air until the cooling of the gases no longer gave support and the operator descended in a parachute, by my invention I am able, with the aid of an internal combustion engine, to not only rise to a predetermined position but I am able to proceed in a horizontal or vertical direction as desired or at the same time to remain suspended substantially in a predetermined position. I am able to do this by the action of the mechanism already described and the operation of which is as follows:—

If it is assumed that the balloon is deflated and lying substantially on the top of the nacelle and the engine is cold, or not being operated, it will be desired to inflate the balloon as rapidly as possible. I thereupon close three of the four valves 30 to the manifold whereby unburnt gaseous mixtures coming from the engine cylinder will pass through pipe 33, container 32 and pipe 28 to exhaust pipe 16. The other valve 30 will be closed so as to prevent gases passing through the course stated and will proceed directly into manifold 21 in exhaust pipe 16. The ignition is then turned on and the ignition on three of the cylinders is diverted to the spark plug 20 the remaining cylinder having its ignition to its regular spark plug (not shown). The engine is then cranked by the propeller 22 whereupon it fires in the cylinder, which is connected to the ignition in regular order, but the other three cylinders having their regular ignition interrupted and diverted to the spark plug 20, will not fire and the carbureted mixture thereupon passes through pipes 33, container 32, and pipe 28 to the exhaust pipe 16 going past spark plug 20. The mixtures are thereupon ignited by the spark at the spark plug 20, but not being under compression do not ignite with explosive force are consumed in a quiet manner passing through pipe 16 to the interior of the envelope together with the exhaust gases from the cylinder in which the explosive mixture is burnt.

In this manner it will be seen that the explosive force from one cylinder is not sufficient to do much more than revolve the engine sufficiently to draw in and discharge a carbureted mixture through the other cylinders which is burnt and passed into the envelope around spark plug 20. The propeller of course will continue revolving but the speed will be slow and by a very slight anchorage the balloon and nacelle may be held in position, a like effect being had by using a variable pitch propeller without anchorage. It will be understood that I do not limit myself to the use of one cylinder for power and three cylinders for supplying carbureted mixture, as I may use two for power and two for supplying carbureted mixture, or in a six, eight, or twelve cylinder engine I may use any number for power and any number for supplying a carbureted mixture as the circumstances may warrant.

It is of course understood that spark plug 20, or other equivalent means of ignition, is removable from the manifold 16 and hence it is apparent that upon failure of engine 34 while in the air a safety measure can be provided by carrying a well known form of gasoline torch in the nacelle 2 and inserting such torch when ignited in place of plug 20, whereby sufficient heated air may continue to inflate bag 1 until a safe landing is made. Preferably such torch is always carried in nacelle 2.

At the same time the action of the engine comprises a pumping action in three of the cylinders, the engine being considered of the four cycle type, and a continual stream of carbureted mixture to be burnt and to inflate the envelope is pumped therethrough and, owing to the fact that there are no heat loses in this mixture for operating the engine, this mixture will give up its heat in large volume to the gases when burnt. In this manner the envelope is very rapidly inflated with burnt gas ranging from 900 to 1500 degrees Fahrenheit in temperature and, instead of running the same cylinder continuously for the operation of filling the envelope, by a suitable arrangement of switches, this cylinder can be cut out and another cylinder cut in.

My apparatus is primarily designed to comprise a small envelope such as would contain a number of cubic feet of heated gases which would be sufficient to substantially balance or slightly lift the weight of the engine, nacelle, fuel, envelope and one or two passengers.

I do not limit myself in my claims to any particular size but I prefer a small envelope such as would not necessarily lift the apparatus to any height but would at least balance the load so that an easy vertical lift may be obtained by the propellers, or the propellers and the elevating planes.

The balloon being filled to its capacity, it becomes necessary to provide for the heated gases being forced into the balloon by the engine, in excess of the balloon's capacity. This is arranged by having closure 11 open a predetermined distance, either by the tension on spring 12 being adjusted to open at a predetermined pressure, or by means of the rope 13, manually operated from the nacelle.

It will be noted that closure 11 is arranged to open outwardly for this purpose, while closure 8 is adapted to resist outward pressure and opens inwardly. Closure 11 is set at the bottom of the balloon, for this is the place where the gases as they cool are collected, and it is desired to let the cooled gases out as soon as possible, replacing them with newly heated gases, in order to maintain buoyancy and replace radiation losses. It will thus be seen that, as desired, a constant stream of burnt gas will be flowing through the balloon in order to sustain it, and to fully take care of the exhaust gases.

The balloon is designed to be filled in from ten to twenty minutes, depending on the size of the engine, the speed and ascent in a vertical line being attained by connecting the propeller 23 to the gear box 26 to the engine. Propeller 22 at this time is thrown out of gear so that it exercises no influence on the motion of the balloon. Propeller 23 continues to lift the balloon and its load to any desired height whereupon it is thrown out of gear and the balloon with its load proceeds on any desired course.

In an alternative arrangement for ascent, if there be room enough on the ground, propeller 23 is thrown out of gear and propeller 22 is thrown in gear drawing balloon and its load along in a horizontal direction and the vertical direction is given by the use of the elevating planes 5, or both propellers 22 and 23 and elevating planes 5 may be used.

Should it be desired, upon reaching some predetermined position, that the balloon should hover over some selected spot all that is necessary to be done will be to cut out three of the cylinders as already described and simply allow sufficient ingress of gases to the balloon as will maintain its buoyancy at any particular altitude. Should the altitude be such that the buoyancy of the gases is not sufficient to maintain the balloon at a desired elevation propeller 22 may be thrown out of gear and propeller 23 be revolved slowly through the gear box 26. Similar effects are of course obtainable by making propellers 22 and 23 variable pitch propellers as described.

In descending the machine may be brought to earth to a predetermined position in several ways. Valves 8 and 11 may be opened to any desired extent after the engine has slowed down so that the balloon will gradually sink, or the balloon, fully inflated, may be directed in a downward direction by the elevating planes 5 the engine going at any desired speed, or propeller 22 may be thrown out of gear and propeller 23 thrown in reverse gear through gear box 26 thereby drawing the balloon to earth, or the whole of the exhaust may be by-passed through pipe 17 to atmosphere thereby allowing the gases in the plane to gradually cool, lose their buoyancy and permit the balloon to sink to earth.

It will thus be seen that by using the waste gases of an internal combustion engine which is being used to drive an aerial machine I am enabled to support the machine by the use of the said waste gases. These waste gases from an internal combustion engine are well known to contain the bulk of the heat introduced in the fuel which is used to drive the engine and in this way out of a given volume of fuel I am enabled to get very high thermal efficiency thereby making the cost of operating an aerial machine very slight compared with a machine which supports itself solely by its speed. At the same time it will be seen that there is no danger of fire or explosion in the envelope due to the fact that there is contained therein solely the gases of combustion, mixed with an inert gas (nitrogen). It will also be seen that the balloon itself forms a very efficient muffler for the engine by reason of its construction wherein the exhaust pipe leads into the interior of the balloon. The methods as described are therefore embodied in the appended claims and I do not limit myself to the sizes as herein mentioned as it will readily be perceived that my apparatus may be operated with one small engine and a small envelope or a multi-engined, large envelope as may be desired.

At starting on the ground the carburetor mixture supplied to engine 34 through its carburetor (not shown) may be a mixture of air and high test gasoline, or a mixture of air and combustible gas. Preferably, at starting on the ground I supply the carburetor of engine 34 with combustible gas from a main and cut off its gasoline supply for the reason that better carburetion can thus be obtained when engine 34 is cold and thus bag 1 is more rapidly inflated. At the same time it is clear that an ignited air-gas mixture could be directly introduced for the same purpose in the manifold 16 in place of plug 20.

Such carbureted mixtures will burn without substantial compression but when engine 34 is pumping a carbureted mixture, a slight degree of compression generally exists in manifold 16, such compression however being in no way comparable with the compression in the cylinders of engine 34.

What is claimed as new is:

1. The method of inflating a balloon which consists in forcing therein the heated gases from a multi-cylinder engine, part of the gases being burnt in one or more of the cylinders and the balance of the gases being burnt between the engine and the balloon.

2. The combination with a balloon bag of a nacelle, a multi-cylinder internal combustion engine attached to the nacelle and means to pass a carbureted charge through one of the cylinders of the engine and ignite the same exterior to the cylinder prior to its passage into the interior of the balloon bag.

3. The combination with a balloon bag of a nacelle, a multi-cylinder internal combustion engine attached to the nacelle and means adapted to inflate the bag with exhaust gases from the engine, the exhaust gases being formed at will by combustion of the carbureted charges from certain of the engine cylinders within the cylinders and passed directly into the bag, and means for igniting the explosive charge after it passes through certain other of said cylinders and supplying the resulting heated gas to said bag simultaneously with or independently of said exhaust gases.

4. In a device for providing heated gases for balloons, a multi-cylinder internal combustion engine having an exhaust manifold, means to pass burnt gases from the engine direct to the balloon through the manifold, means to pass unburnt gases from the engine to the manifold, means to ignite the unburnt gases in the manifold and means to control the passage of burnt gases in the manifold.

5. The method of inflating a balloon which consists in forcing therein heated gases from a multi-cylinder internal combustion engine, part of the gases being derived from the combustion under compression of a mixture of fuel and air in one or more of the engine cylinders and part of the gases being derived from the combustion without compression of a mixture of fuel and air supplied by the engine.

6. In a device for providing heated gases for balloons, a multi-cylinder internal combustion engine having an insulated exhaust manifold, means to pass burnt gases from the engine to the balloon through the manifold, means to pass combustible gases to the manifold and means for burning said combustible gases without the cylinders of said engine.

7. In flying apparatus including a balloon bag, a nacelle carried by the bag and an internal combustion engine in the nacelle, means for passing gases from the engine to the bag comprising an insulated exhaust pipe, and means between said engine and bag for heating a portion of said gases.

8. In flying apparatus including a balloon bag, a nacelle carried by the bag and an internal combustion engine in the nacelle, means for passing gases from the engine to the bag comprising an insulated exhaust pipe, and means for heating a portion of said gases without utilizing the expansive force thereof for operating said engine.

9. In combination, a balloon, a nacelle and an internal combustion engine having a crank shaft, means for supporting the nacelle and engine from the balloon, means to pass exhaust gases from the engine to the balloon for supporting the same in the air and means adapted to operate independently of or in conjunction with said seond-named means for supplying heated gases to said engine, the explosive mixture for forming said gases being supplied by said engine.

Signed at Wilmington, in the county of Los Angeles, and State of California, this 24 day of June, A. D. 1925.

CHARLES LAWRENCE STOKES.